United States Patent
Toyoda

(10) Patent No.: US 11,022,621 B2
(45) Date of Patent: Jun. 1, 2021

(54) IMAGE ACQUISITION SYSTEM AND IMAGE ACQUISITION METHOD

(71) Applicant: HAMAMATSU PHOTONICS K.K., Hamamatsu (JP)

(72) Inventor: Yuichi Toyoda, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/485,578

(22) PCT Filed: Mar. 12, 2018

(86) PCT No.: PCT/JP2018/009467
§ 371 (c)(1),
(2) Date: Aug. 13, 2019

(87) PCT Pub. No.: WO2018/190055
PCT Pub. Date: Oct. 18, 2018

(65) Prior Publication Data
US 2020/0011889 A1   Jan. 9, 2020

(30) Foreign Application Priority Data
Apr. 13, 2017 (JP) .............................. JP2017-079671

(51) Int. Cl.
*G01N 35/00* (2006.01)
*G02B 21/34* (2006.01)
*G06K 7/14* (2006.01)

(52) U.S. Cl.
CPC ....... *G01N 35/00732* (2013.01); *G02B 21/34* (2013.01); *G06K 7/1413* (2013.01); *G06K 7/1417* (2013.01); *G01N 2035/00752* (2013.01)

(58) Field of Classification Search
CPC ... G01N 35/00732; G01N 2035/00742; G01N 2035/00752; G01N 2035/00792;
(Continued)

(56) References Cited

U.S. PATENT DOCUMENTS 4,453,807 A * 6/1984 Faulkner ................ G02B 21/34
356/244
4,761,075 A   8/1988 Matsushita et al.
(Continued)

FOREIGN PATENT DOCUMENTS

EP   2 966 493 A1   1/2016
JP   S62-135767 A   6/1987
(Continued)

OTHER PUBLICATIONS

International Preliminary Report on Patentability (IPRP) dated Oct. 24, 2019 that issued in WO Patent Application No. PCT/JP2018/009467.

*Primary Examiner* — Daniel I Walsh
(74) *Attorney, Agent, or Firm* — Faegre Drinker Biddle & Reath LLP

(57) ABSTRACT

An image acquisition system includes a cassette mounting unit that holds slide glasses in a plurality of stages, a cassette having an identification code imparted thereto being mounted in the cassette mounting unit, an identification code reading unit that reads an identification code from the cassette, an image acquisition unit that acquires image data of a sample held on the slide glass, and a control computer that associates the image data with cassette identification information included in the identification code read by the identification code reading unit, wherein the cassette mounting unit includes a notch portion that exposes a bar code imparted to the cassette, and the identification code reading
(Continued)

unit includes an imaging unit that images the identification code exposed from the notch portion in a reading position.

14 Claims, 13 Drawing Sheets

(58) Field of Classification Search
CPC ....... G01N 2035/00831; G06K 7/1417; G02B 21/002; G02B 21/34
See application file for complete search history.

(56) References Cited

U.S. PATENT DOCUMENTS

| | | | | |
|---|---|---|---|---|
| 5,386,318 | A * | 1/1995 | Kuhnert | G01N 35/04 359/391 |
| 5,963,368 | A * | 10/1999 | Domanik | G02B 21/365 356/72 |
| 6,049,421 | A * | 4/2000 | Raz | G02B 21/002 356/244 |
| 7,948,676 | B2 * | 5/2011 | Virag | G02B 21/34 359/391 |
| 9,001,422 | B2 * | 4/2015 | Taylor | G02B 21/34 359/391 |
| 9,036,255 | B2 * | 5/2015 | Loney | G02B 21/245 359/391 |
| 10,007,102 | B2 * | 6/2018 | Bickert | G02B 21/26 |
| D848,433 | S * | 5/2019 | Toyoda | D14/436 |
| D886,830 | S * | 6/2020 | Suzuki | D14/453 |
| D892,811 | S * | 8/2020 | Suzuki | D14/453 |
| D893,505 | S * | 8/2020 | Suzuki | D14/453 |
| 2002/0167577 | A1 * | 11/2002 | Kiene | B41J 3/4073 347/102 |
| 2003/0087443 | A1 * | 5/2003 | Pressman | G01N 1/2813 436/46 |
| 2005/0226770 | A1 * | 10/2005 | Allen | G01N 35/00732 422/63 |
| 2006/0029519 | A1 * | 2/2006 | Nakaya | G01N 1/312 422/63 |
| 2006/0051241 | A1 * | 3/2006 | Higuchi | G01N 1/2813 422/67 |
| 2007/0148046 | A1 * | 6/2007 | Nakaya | G01N 35/04 422/82.05 |
| 2008/0240613 | A1 * | 10/2008 | Dietz | G02B 21/367 382/284 |
| 2008/0317566 | A1 * | 12/2008 | Virag | G02B 21/34 414/222.07 |
| 2009/0111101 | A1 * | 4/2009 | Tafas | G06K 9/00127 435/6.11 |
| 2010/0315502 | A1 * | 12/2010 | Tafas | H04N 7/181 348/79 |
| 2011/0304722 | A1 * | 12/2011 | Nilsson | G01N 35/00029 348/79 |
| 2012/0176489 | A1 * | 7/2012 | Oshiro | G02B 27/0075 348/80 |
| 2013/0201553 | A1 * | 8/2013 | James | G02B 21/34 359/398 |
| 2014/0178169 | A1 * | 6/2014 | Hebert | B01L 9/52 414/752.1 |
| 2014/0240824 | A1 * | 8/2014 | Taylor | G02B 21/34 359/391 |
| 2014/0362436 | A1 * | 12/2014 | Forget | G01N 1/312 359/391 |
| 2018/0031588 | A1 * | 2/2018 | Nakajima | G01N 1/2813 |
| 2018/0136448 | A1 * | 5/2018 | Cramb | G02B 21/361 |
| 2019/0105021 | A1 * | 4/2019 | Von Bueren | A61B 90/90 |
| 2020/0355710 | A1 * | 11/2020 | Cinti | G01N 35/00029 |

FOREIGN PATENT DOCUMENTS

| | | |
|---|---|---|
| JP | 2010-500616 A | 1/2010 |
| JP | 2013-127578 A | 6/2013 |
| JP | 2014-526712 A | 10/2014 |
| WO | WO-2007/106789 A2 | 9/2007 |
| WO | WO-2008/019311 A2 | 2/2008 |
| WO | WO-2013/034430 A1 | 3/2013 |
| WO | WO-2014/045759 A1 | 3/2014 |

* cited by examiner

*Fig.9*

| CASSETTE IDENTIFICATION INFORMATION | EXECUTION ORDER | EXECUTION SITUATION |
|---|---|---|
| WX6FV | 1 | DONE |
| AAG19 | 2 | DONE |
| BKAGI | 4 | BUSY |
| 6HMAI | 3 | DONE |
| KABDU | 6 | PENDING |
| 2HAD3 | 5 | PENDING |
| JSIEBD | 7 | PENDING |
| ⋮ | ⋮ | ⋮ |

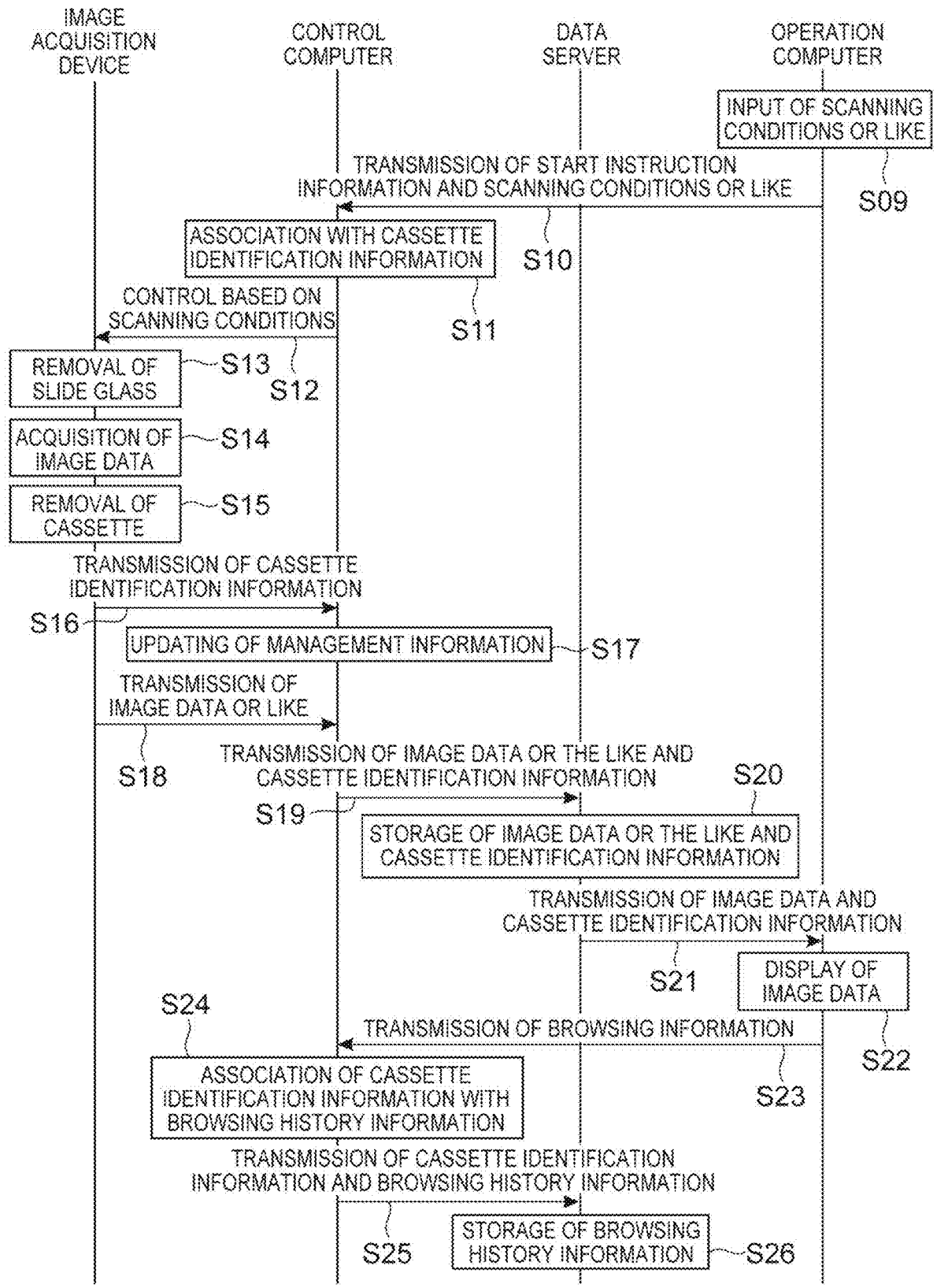

Fig. 11

| CASSETTE IDENTIFICATION INFORMATION | PATIENT ID | SCANNING CONDITIONS 1 (MAGNIFICATION OF OBJECTIVE LENS) | SCANNING CONDITIONS 2 (SCAN RANGE) | SCANNING CONDITIONS 3 (NUMBER OF FOCAL POSITION MEASUREMENTS) |
|---|---|---|---|---|
| WX6FV | 20170517000000001 | 40 TIMES | AUTO | 9 POINTS |
| AAG19 | 20170808000005088 | 20 TIMES | AUTO | 5 POINTS |
| BKAGI | 20170808000005087 | 40 TIMES | PRESET | 5 POINTS |
| 6HMAI | 20160413000005878 | 40 TIMES | AUTO | 5 POINTS |
| KABDU | 20160708000005387 | 40 TIMES | PRESET | 3 POINTS |
| 2HAD3 | 20170209000444457 | 20 TIMES | AUTO | 9 POINTS |
| JSIEBD | 20170808000005567 | 40 TIMES | AUTO | 9 POINTS |
| ... | ... | ... | ... | ... |

*Fig.12*

| CASSETTE IDENTIFICATION INFORMATION | SLIDE GLASS NUMBER 1 | SLIDE GLASS NUMBER 2 | SLIDE GLASS NUMBER 3 | SLIDE GLASS NUMBER 4 | SLIDE GLASS NUMBER 5 | ⋮ |
|---|---|---|---|---|---|---|
| WX6FV | BROWSED | BROWSED | BROWSED | BROWSED | BROWSED | ⋮ |
| AAG19 | BROWSED | BROWSED | NOT BROWSED | NOT BROWSED | NOT BROWSED | ⋮ |
| BKAGI | BROWSED | BROWSED | NOT BROWSED | BROWSED | NOT BROWSED | ⋮ |
| 6HMAI | NOT BROWSED | NOT BROWSED | NOT BROWSED | NOT BROWSED | NOT BROWSED | ⋮ |
| KABDU | BROWSED | BROWSED | BROWSED | BROWSED | BROWSED | ⋮ |
| 2HAD3 | BROWSED | BROWSED | BROWSED | BROWSED | BROWSED | ⋮ |
| JSIEBD | BROWSED | BROWSED | BROWSED | ... | ... | ⋮ |
| ... | ... | ... | ... | ... | ... | ⋮ |

IMAGE ACQUISITION SYSTEM AND IMAGE ACQUISITION METHOD

TECHNICAL FIELD

The present disclosure relates to an image acquisition system and an image acquisition method.

BACKGROUND ART

An example of this type of image acquisition device includes an image acquisition device described in Patent Literature 1. This image acquisition device includes a macro image acquisition device that acquires a macro image of a sample, and a micro image acquisition device that acquires a micro image of the sample. The macro image acquisition device acquires a macro image of a sample on a slide glass, and sets a scan range, focus acquisition information, and the like for acquiring a micro image on the basis of the acquired macro image. The micro image acquisition device includes an objective lens with a high magnification. The micro image acquisition device acquires a high magnification (high resolution) image of the sample on the slide glass using the high magnification objective lens on the basis of scanning conditions set on the basis of the macro image.

CITATION LIST

Patent Literature

[Patent Literature 1] Japanese Unexamined Patent Publication No. 2013-127578

SUMMARY OF INVENTION

Technical Problem

In an image acquisition device, rescanning may be executed with different scanning conditions for a sample of which image acquisition has already been performed, according to, for example, observation results of the sample. In this case, checking the scanning conditions at the time of a previous image acquisition and image data acquired using the scanning conditions together is useful for observation of the sample.

However, in an image acquisition device of the related art, it is common to store scanning conditions in units of jobs, that is, using all of set slide glasses as one unit. Therefore, it is necessary to re-prepare all the slide glasses in order to execute rescanning, and storage work or re-preparation work for the slide glasses has been complicated.

The present disclosure has been made to solve the above-described problems, and an object of the present disclosure is to provide an image acquisition system and an image acquisition method capable of simplifying storage work or re-preparation work for slide glasses.

Solution to Problem

An image acquisition system according to an aspect of the present disclosure is an image acquisition system for acquiring an image of samples held on slide glasses, the image acquisition system including: a cassette mounting unit in which a cassette is detachably mounted, the cassette holding in a plurality of stages in a predetermined arrangement direction and having an identification code imparted thereto; a reading unit that reads the identification code from the cassette sent to a reading position by the cassette mounting unit; an image acquisition unit that acquires image data of the sample held on the slide glass in the cassette; and a control unit that associates the image data acquired by the image acquisition unit with cassette identification information included in the identification code read by the reading unit, wherein the cassette mounting unit includes an exposure portion that exposes the identification code imparted to the cassette, and the reading unit includes an imaging unit that images the identification code exposed from the exposure portion in the reading position.

In this image acquisition system, the image data acquired by the image acquisition unit is associated with the cassette identification information. Thus, by associating the image data in units of cassettes, the slide glass linked to the cassette becomes clear. Therefore, it is possible to simplify storage work or re-preparation work for the slide glass, as compared with a case in which the image data of the slide glass is managed in units of jobs. Further, in the image acquisition system, the imaging unit images the identification code exposed from the exposure portion of the cassette mounting unit in the reading position. Accordingly, it is also possible to achieve simplification of a device configuration necessary for reading of the identification code.

Further, the cassette mounting unit may include a rotation drum including a bottom plate, a top plate, and a cassette holding plate that is radially disposed between the bottom plate and the top plate and forms a holding space of the cassette in a circumferential direction, and the exposure portion may be configured by a notch portion provided in the top plate according to a position in the holding space. In this case, it is possible to image the identification code exposed from the notch portion of the rotation drum using the imaging unit without an increase in a size of the rotation drum.

Further, the image acquisition system may further include a slide glass detection unit that detects at least one of a holding position and a holding state of the slide glass in the cassette mounted in the cassette mounting unit, wherein the reading position of the reading unit and a detection position of the slide glass detection unit may be the same positions. In this case, it is possible to simplify control of sending of the cassette mounted in the cassette mounting unit.

Further, the image acquisition system may include an identification card to which the identification code has been imparted, wherein an attachment unit to which the identification card is detachably attached is provided in the cassette. By storing the slide glass and the identification card of which the image acquisition has ended together through introduction of the identification card, it is possible to further simplify storage work or re-preparation work for the slide glass. Further, by replacing the identification card, the same identification code can be simply imparted to a different cassette.

Further, the identification code may be at least one of a bar code and a two-dimensional code. In this case, it is possible to perform management of cassette identification information more easily.

Further, the control unit may associate scanning conditions when the image acquisition unit acquires the image data of the sample with the cassette identification information. Thus, it is possible to simply call past scanning conditions when re-scanning of the slide glass is executed.

Further, the image acquisition system may further include a storage unit that stores the image data acquired by the image acquisition unit; and a browsing unit that reads and displays the image data stored in the storage unit, wherein the control unit may associate browsing history information indicating a browsing history via the browsing unit with the cassette identification information. In this case, it is possible to suitably prevent browsing of the stored image data from being omitted.

Further, the control unit may associate acquisition source identification information for identifying an acquisition source of the sample with the cassette identification information. In this case, it is possible to suitably prevent sample misunderstanding from occurring.

Further, the control unit may store management information indicating an execution order of image acquisition for each cassette in association with the cassette identification information. In this case, it is possible to perform scan execution management of the slide glass using a common image acquisition unit.

Further, an image acquiring method according to an aspect of the present disclosure is an image acquisition method for acquiring an image of samples held on slide glasses, the image acquisition method including: a mounting step of mounting a cassette in a cassette mounting unit, the cassette holding the slide glasses in a plurality of stages in a predetermined arrangement direction and having an identification code imparted thereto; a reading step of reading the identification code from the cassette sent to a reading position by the cassette mounting unit; an image acquisition step of acquiring image data of the sample held on the slide glass in the cassette; and an association step of associating the image data acquired in the image acquisition step with cassette identification information included in the identification code read in the reading step, wherein the cassette mounting unit includes an exposure portion that exposes the identification code imparted to the cassette, and the reading step includes imaging the identification code exposed from the exposure portion in the reading position.

In this image acquisition method, the image data acquired in the image acquisition step is associated with the cassette identification information. Thus, by associating the image data in units of cassettes, the slide glass linked to the cassette becomes clear. Therefore, it is possible to simplify storage work or re-preparation work for the slide glass, as compared with a case in which the image data of the slide glass is managed in units of jobs. Further, in the image acquisition method, the identification code exposed from the exposure portion of the cassette mounting unit is imaged in the reading position. Accordingly, it is also possible to achieve simplification of a device configuration necessary for reading of the identification code.

The association step may include associating scanning conditions when the image data of the sample has been acquired in the image acquisition step with the cassette identification information. Thus, it is possible to simply call past scanning conditions when re-scanning of the slide glass is executed.

Further, the method may further include a storage step of storing the image data acquired in the image acquisition step; and a browsing step of browsing the image data stored in the storage step, wherein the association step may include associating browsing history information indicating a browsing history in the browsing step with the cassette identification information. In this case, it is possible to suitably prevent browsing of the stored image data from being omitted.

Further, the association step may include associating acquisition source identification information for identifying an acquisition source of the sample with the cassette identification information. In this case, it is possible to suitably prevent sample misunderstanding from occurring.

Further, the association step may include associating management information indicating an execution order of image acquisition for each cassette with the cassette identification information. In this case, it is possible to perform scan execution management of the slide glass using a common image acquisition unit.

Further, at least one of a bar code and a two-dimensional code may be used as the identification code. Accordingly, it is possible to perform management of the cassette identification information easily.

Advantageous Effects of Invention

According to the present disclosure, it is possible to simplify storage work or re-preparation work for the slide glass.

BRIEF DESCRIPTION OF DRAWINGS

FIG. 9 is a diagram illustrating an example of management information.

FIG. 10 is a flowchart illustrating an example of an operation subsequent to FIG. 8.

FIG. 11 is a diagram illustrating an example of scanning conditions.

FIG. 12 is a diagram illustrating an example of browsing management information.

DESCRIPTION OF EMBODIMENTS

Hereinafter, preferred embodiments of an image acquisition system and an image acquisition method according to an aspect of the present disclosure will be described in detail with reference to the drawings.

Figure 1:
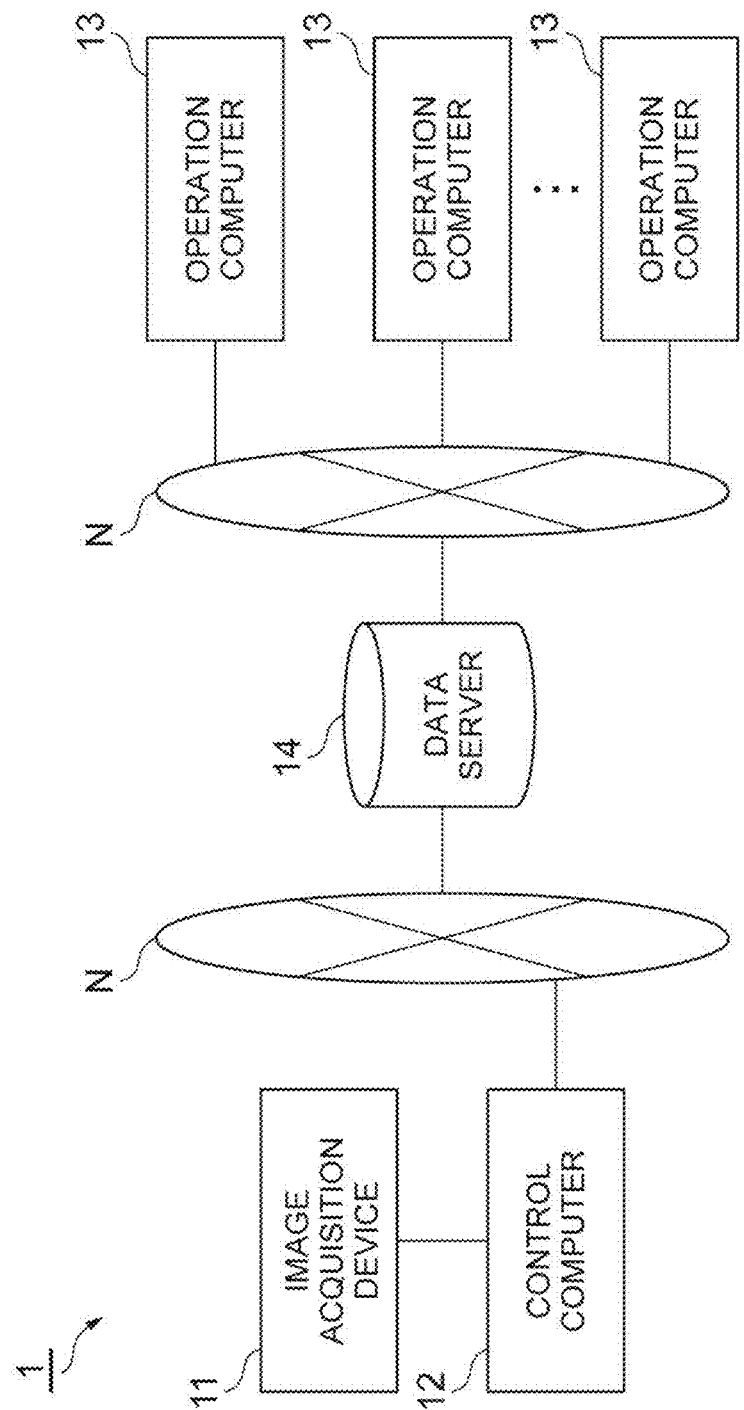
FIG. 1 is a system configuration diagram illustrating an embodiment of an image acquisition system.

FIG. 1 is a system configuration diagram illustrating an embodiment of an image acquisition system. As illustrated in FIG. 1, an image acquisition system 1 includes an image acquisition device 11, a control computer (a control unit) 12 that controls an operation of the image acquisition device 11 and performs association of various types of information, one or a plurality of operation computers 13 that is used for operation of the image acquisition device 11, and a data server (a storage unit) 14 that stores various pieces of data that is used in the image acquisition system 1. The image acquisition system 1 is a system in which the image acquisition device 11 is remotely operated using operation computers 13 at different installation places, a virtual slide image of a sample such as a biological sample is acquired by the image acquisition device 11, and observation of the sample based on the virtual slide image can be performed at various facilities.

The control computer 12 and the operation computers 13 are physically a computer system that includes a memory such as a RAM and a ROM, and a processor (an arithmetic circuit) such as a CPU. The control computer 12 and the operation computer 13 are, for example, a personal computer, a smart device, a microcomputer, or a cloud server. Further, a display device such as a display, an input device such as a keyboard and a mouse, and the like are connected to the control computer 12 and the operation computer 13. Further, the display device and the input device may be a touch screen or a smart device.

The image acquisition device 11 and the control computer 12 are installed, for example, in the same room in a facility and are connected by a cable or wirelessly so that the image acquisition device 11 and the control computer 12 can communicate information with each other. The data server 14 is installed, for example, in a data center different from the facility in which the image acquisition device 11 and the control computer 12 are installed, and is connected to the control computer 12 via the network N so that the data server 14 can communicate information with the control computer 12. The operation computer 13 is installed, for example, in an arbitrary facility, and is connected to the data server 14 via the network N so that the operation computer 13 can communicate information with the data server 14. It should be noted that the image acquisition device 11 and the control computer 12 may be installed in separate facilities or separate rooms. Further, the data server 14 may be installed in the same facility as the control computer 12.

The control computer 12 and the operation computer 13 receive an input such as scanning conditions for a sample in the image acquisition device 11 from a user, and controls an operation of the image acquisition device 11 on the basis of the input condition.

Further, the control computer 12 transmits various pieces of data such as image data acquired by the image acquisition device 11 to the data server 14. The control computer 12 associates the image data acquired by the image acquisition device 11 with various types of information. The control computer 12 or the operation computer 13 constitutes a browsing unit in the present disclosure. That is, the control computer 12 or the operation computer 13 has a browsing function of displaying a virtual slide image acquired by the image acquisition device 11 on a display by referring to various pieces of data stored in the data server 14. An operation of the image acquisition system 1 will be described below.

Figure 2:
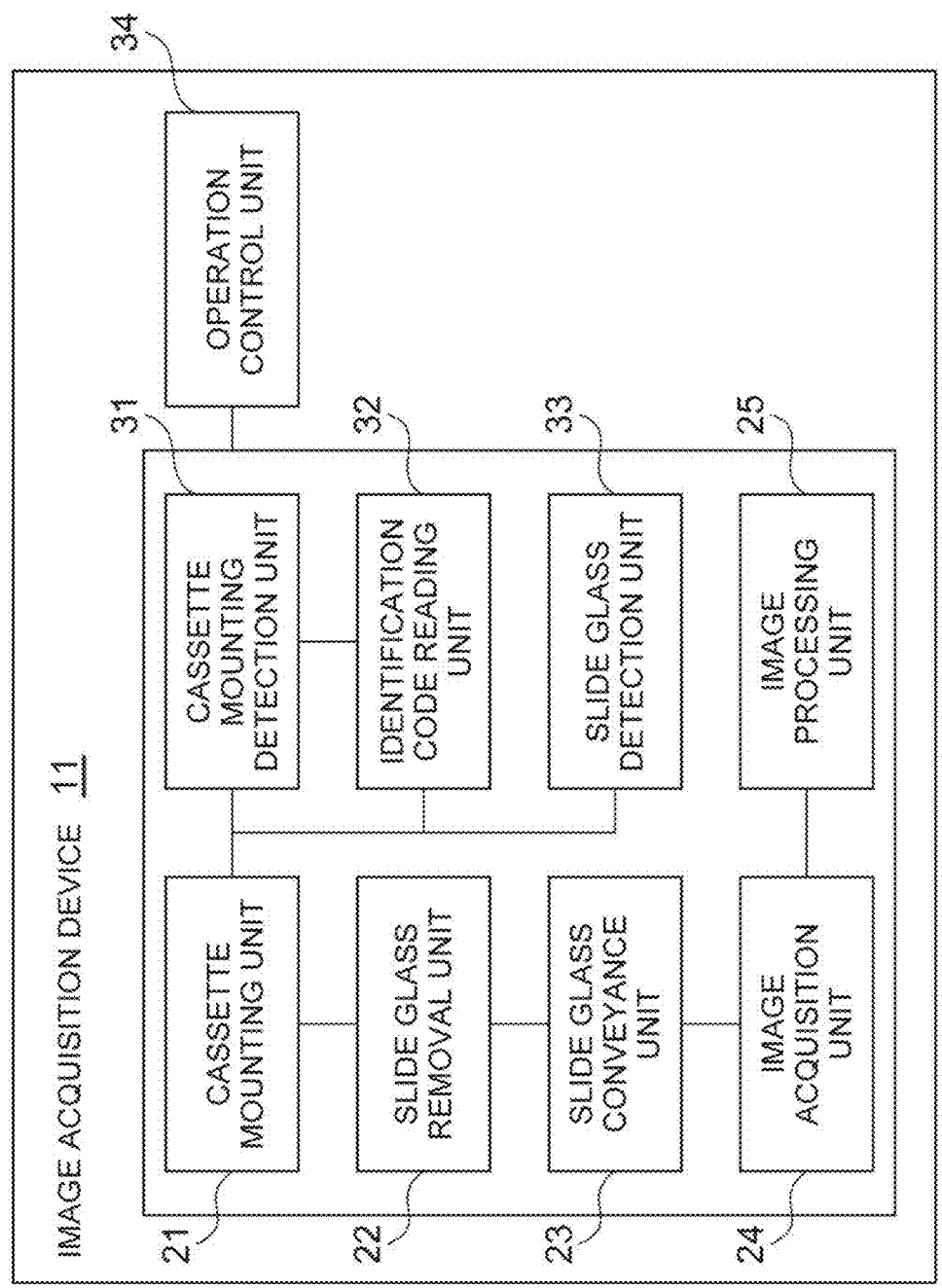
FIG. 2 is a block diagram illustrating an example of the image acquisition device.

Next, the image acquisition device 11 will be described. FIG. 2 is a block diagram illustrating an embodiment of an image acquisition device. As illustrated in FIG. 2, the image acquisition device 11 includes a cassette mounting unit 21, a slide glass removal unit 22, a slide glass conveyance unit 23, an image acquisition unit 24, and an image processing unit 25. Further, for the cassette mounting unit 21, a cassette mounting detection unit 31, an identification code reading unit (a reading unit) 32, and a slide glass detection unit 33 are provided. Further, the image acquisition device 11 further includes an operation control unit 34 that controls an operation of each of these components on the basis of control from the control computer 12 or the operation computer 13.

Figure 3:
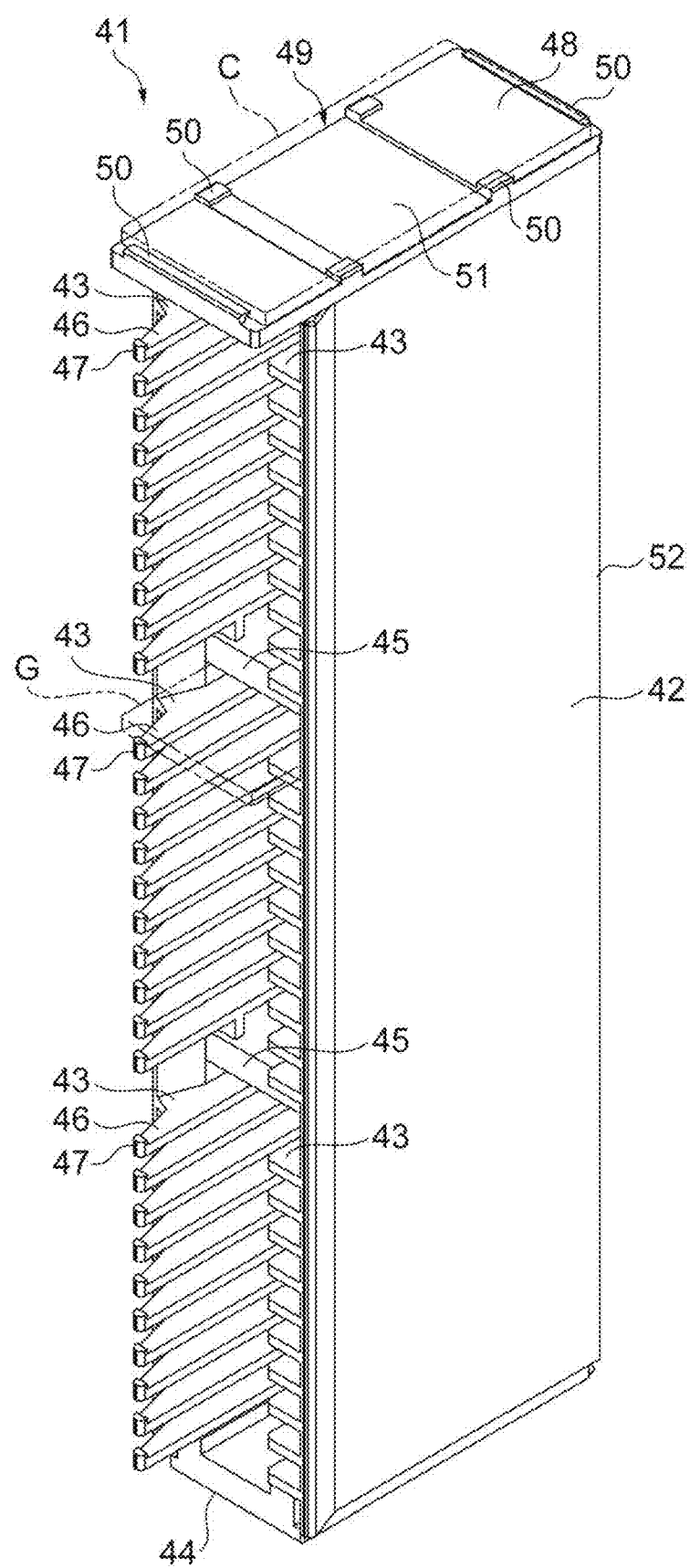
FIG. 3 is a perspective view illustrating an example of a cassette that holds a slide glass from the front surface side.
Figure 4:
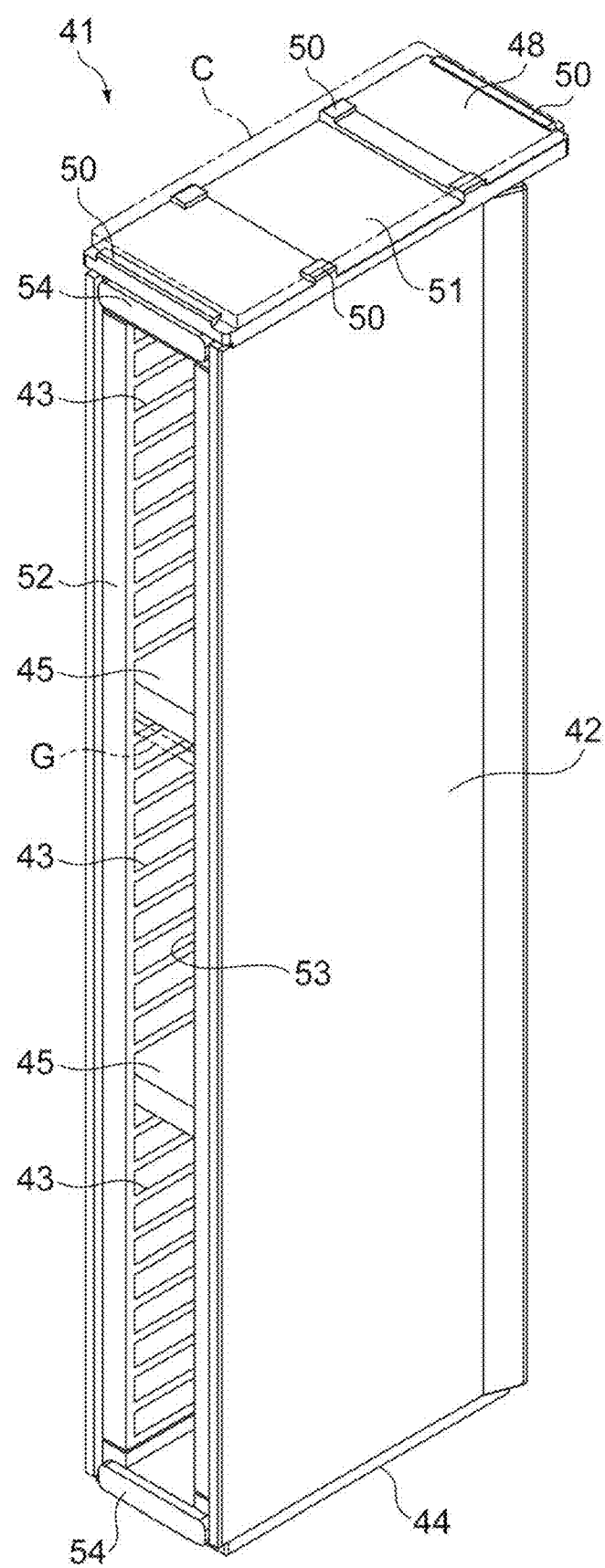
FIG. 4 is a perspective view illustrating the cassette illustrated in FIG. 3 from the back surface side.

The cassette mounting unit 21 is a cassette holder in which a cassette 41 holding a plurality of slide glasses is detachably mounted. As illustrated in FIGS. 3 and 4, the cassette 41 includes a casing 42 made of a resin having a vertically long, substantially rectangular parallelepiped shape. Holding plates 43 and 43 that overhang toward the inner side of the casing 42 are provided on a pair of inner side walls of the casing 42, respectively. By placing the slide glass G on the holding plates 43 and 43, the slide glass G is held in parallel with a bottom surface 44 of the casing 42.

In the cassette 41 of the embodiment, 30 stages of holding plates 43 and 43 are provided in a height direction of the cassette 41, and 30 slide glasses G can be held at one time. Further, in the embodiment, a partition plate 45 is disposed every 10 stages, and a holding interval of the slide glasses G in a disposition position of the partition plate 45 is wider than other positions. Accordingly, the holding position of the slide glass G can be visually ascertained with ease.

One holding plate 43 and the other holding plate 43 are spaced from each other at a central portion of the casing 42. Further, the one holding plate 43 includes a projection portion 46 that projects to the front surface side of the casing 42, and a claw portion 47 that is provided at the tip of the projection portion 46. A width of the projection portion 46 is narrowed toward the front surface side of the casing 42, and the claw portion 47 is provided upwardly at the tip of the tapered projection portion 46. With such a configuration, in a state in which the slide glass G is mounted on the holding plates 43 and 43, a bottom surface of the slide glass G (particularly, the vicinity of a corner portion) is exposed from the holding plates 43 and 43 with a sufficient area. Therefore, the slide glass G can be easily removed from the holding plates 43 and 43 with a finger.

A placement unit (an attachment unit) 49 in which an identification card C is placed is provided in a top surface 48 of the cassette 41. The placement unit 49 has a plurality of claws 50 provided at an edge of the top surface 48. Side surfaces of the identification card C placed in the placement unit 49 are held by the claws 50. Further, a recessed portion 51 is provided with a constant width over the entirety in a width direction of the top surface 48 in a central portion of the top surface 48. Since a central portion of the identification card C floats from the placement unit 49 due to the recessed portion 51, the identification card C can be easily removed from the placement unit 49 with a finger.

Figure 5:
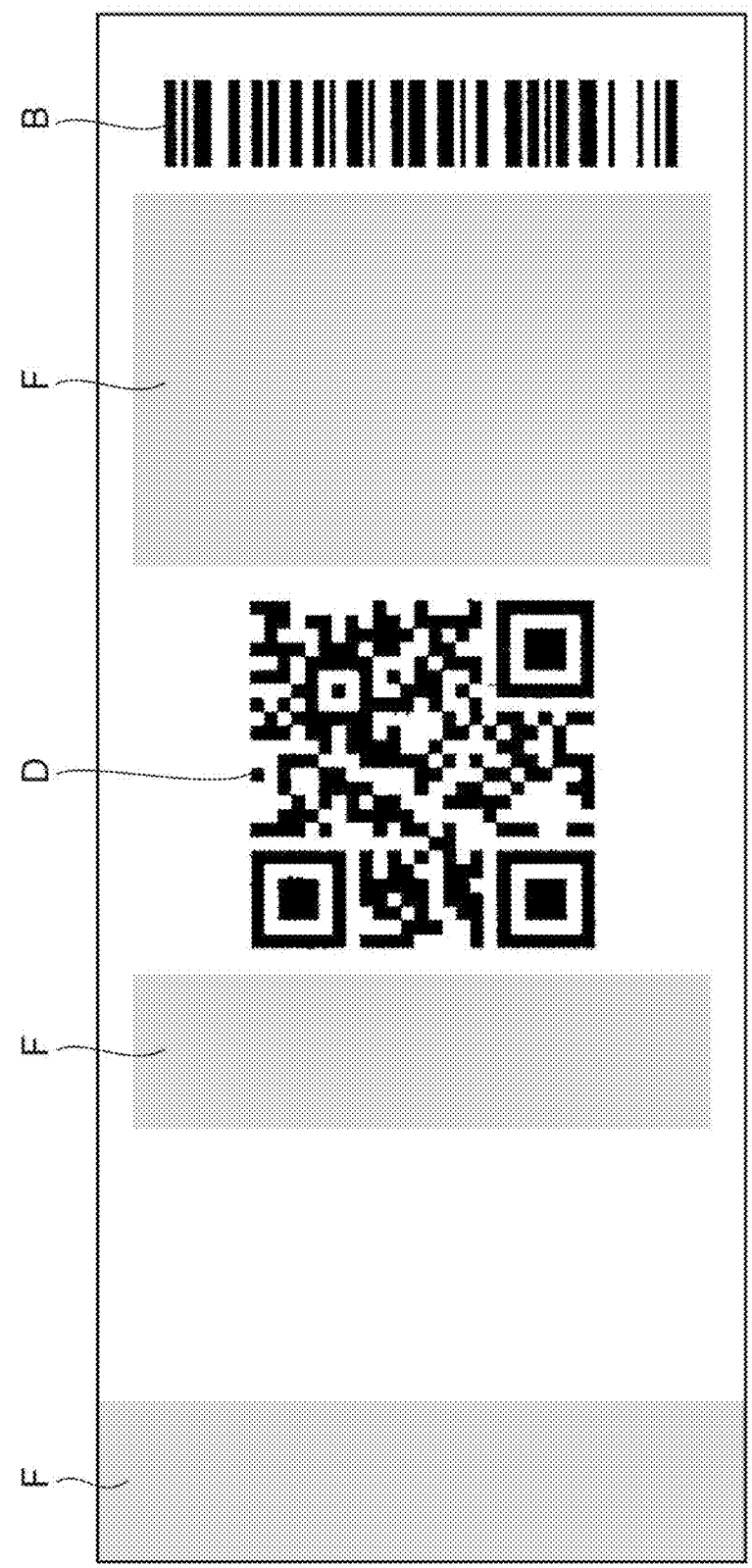
FIG. 5 is a plan view illustrating an example of an identification card.

The identification card C is, for example, a plate-like member made of plastic. As illustrated in FIG. 5, a bar code (an identification code) B including identification information for identifying the cassette 41 (hereinafter referred to as cassette identification information) as a character string is imparted to an edge on one surface side of the identification card C. In the embodiment, a planar shape of the identification card C is a rectangular shape having a length dimension greater than that of the slide glass G. Accordingly, when the identification card C is stored together with a bundle of slide glasses G, an edge portion of the identification card C protrudes beyond an edge portion of the slide glass G, and thus, detection of the identification card C, which is a target, is facilitated. It should be noted that the planar shape of the identification card C may be a rectangular shape having a width dimension greater than that of the slide glass G.

The bar code B may be directly printed on the identification card C or a seal on which the bar code B has been printed may be pasted to the identification card C. A two-dimensional code (an identification code) D such as a QR code (registered trademark) may be imparted to one surface side of the identification card C, and a writing space F in which writing characters or the like can be freely performed may be provided in one surface side of the identification card C. A position of disposition of the bar code B, the two-dimensional code D, and the writing space F on the one surface side of the identification card C may be any position.

Further, as illustrated in FIG. 4, an opening 53 is provided at a central portion of a back surface 52 of the cassette 41. The opening 53 corresponds to a holding area of the slide glass G by the holding plates 43 and 43 and extends with a constant width in the height direction of the cassette 41. Therefore, in an area in which the opening 53 is provided, it is possible to see the back surface side of the cassette 41 from the front surface side through the opening 53. Further, on the back surface 52 of the cassette 41, metal plates 54 that are used for mounting of the cassette 41 in the cassette mounting unit 21 are provided at positions below the opening 53 and above the opening 53, respectively. The metal plates 54 have, for example, a strip shape having a length substantially equal to a width of an internal space of the cassette 41 and is fixed to the casing 42 by a fastening means such as a screw.

Figure 6:
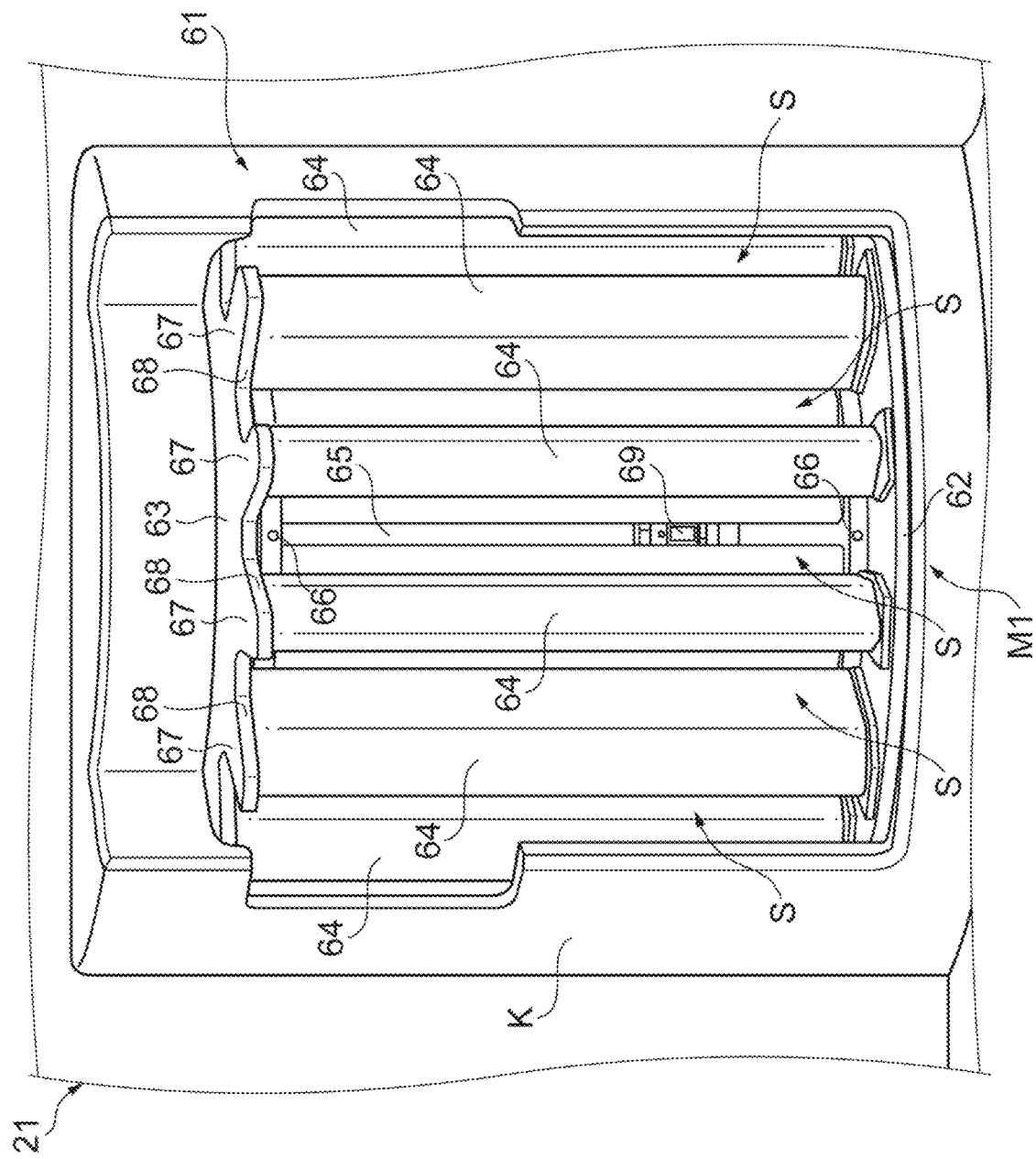
FIG. 6 is a front view illustrating an example of a cassette mounting unit.

FIG. 6 is a front view illustrating an example of the cassette mounting unit 21. As illustrated in FIG. 5, the cassette mounting unit 21 includes a rotation drum 61 in which a plurality of cassette 41 can be mounted, in a frame K. The rotation drum 61 includes a bottom plate 62, a top plate 63, and a plurality of cassette holding plates 64 disposed between the bottom plate 62 and the top plate 63. A strut 65 is provided at a central portion of the rotation drum 61. The strut 65 are passed through openings respectively provided in a central portion of the bottom plate 62 and a central portion of the top plate 63, and serves as a fixed shaft (a non-rotating shaft). The strut 65 may be either a cylinder or a prism.

The cassette holding plates 64 are radially disposed with a constant phase angle around a central axis of the rotation drum 61. A space between the adjacent cassette holding plates 64 and 43 serves as a holding space S of the cassette 41 described above. In the embodiment, twelve holding spaces S are provided in a circumferential direction of the rotation drum 61. Since the cassette holding plates 64 are radially disposed, the holding space S is narrowed toward the back side from the outer circumferential side of the rotation drum 61. Further, end portions of the adjacent cassette holding plates 64 are spaced at constant intervals on the back side of the holding space S. Accordingly, a peripheral surface or a side surface of the strut 65 on a back side of the holding space S can be seen from the front surface side of the rotation drum 61.

Magnets 66 are provided at positions on the back side of the holding spaces S on the bottom plate 62 and the top plate 63, respectively. By inserting the cassette 41 (see FIGS. 3 and 4) into the holding space S in a state in which the back surface side is directed to the back side, the upper and lower metal plates 54 on the back surface side of the cassette 41 are coupled to the upper and lower magnets 66 of the holding space S by a magnetic force. Thus, the cassette 41 is detachably held on the rotation drum 61. Accordingly, the cassette 41 is detachably held on the rotation drum 61. It should be noted that the magnet 66 may be provided on at least one of the bottom plate 62 or the top plate 63. In this case, a metal plate 54 may be provided on the back surface side of the cassette 41 to correspond to a position of the magnet 66.

An actuator that rotates the rotation drum 61 in one direction (for example, clockwise) around the central axis is provided at a portion under the bottom plate 62. In the rotation drum 61 of the embodiment, a mounting position M1 of the cassette 41 is set so that the cassette 41 is directed to the front surface side of the image acquisition device 11. In the example of FIG. 6, in the mounting position M1, three holding spaces S can be accessed from a window of the frame K, and three cassettes 41 can be mounted on the rotation drum 61 at one time. The cassettes 41 held in the holding space S are sequentially sent from the mounting position M1 to a reading position M2 in which various readings and detections are performed and a removal position M3 in which the slide glass G in the cassette 41 is taken out and sent to the image acquisition unit 24, by rotation of the rotation drum 61.

Further, the top plate 63 includes a plurality of holding pieces 67 that extend radially from the center side and hold upper ends of the cassette holding plates 64. A notch portion 68 (an exposure portion) corresponding to a planar shape of the holding space S is provided between the holding pieces 67 and 67. The top surface 48 (that is, the placement unit 49 of the identification card C) of the cassette 41 held in the holding space S can be seen through the top plate 63 by the notch portion 68.

Referring back to FIG. 2, the cassette mounting detection unit 31 detects a mounting state of the cassette 41 on the rotation drum 61. The cassette mounting detection unit 31 includes, for example, a distance sensor 69 that detects a distance from the cassette 41 held in the holding space S to the strut 65, and determines whether or not the mounting state of the cassette 41 is good on the basis of a detection result of the distance sensor 69.

The identification code reading unit 32 reads at least one of the bar code B and the two-dimensional code D imparted to the identification card C. The identification code reading unit 32 is, for example, an identification code reader disposed near the rotation drum 61. The identification code reading unit 32 reads at least one of the bar code B and the two-dimensional code D from the identification card C placed on the placement unit 49 of the cassette 41 in the reading position M2. The identification code reading unit 32 outputs cassette identification information included in the read bar code B or two-dimensional code D to the control computer 12.

The slide glass detection unit 33 detects at least one of the holding position and the holding state of the slide glass G in the cassette 41. For example, the slide glass detection unit 33 includes a photoelectric sensor 71 disposed outside the rotation drum 61, and detects the holding position or the holding state of the slide glass G in the cassette 41 sent to the detection position by the rotation of the rotation drum 61. The photoelectric sensor 71 is also referred to as a beam sensor, a photoelectric sensor, or a laser sensor. The slide glass detection unit 33 outputs holding information indicating the detected holding position or holding state to the slide glass removal unit 22. The slide glass detection unit 33 may perform reporting using a reporting means when there is an abnormality in the detected holding position or holding state.

The slide glass removal unit 22 removes the slide glass G from the cassette 41 held by the rotation drum 61. The slide glass removal unit 22 includes a removal means such as a conveyance hand, and sequentially removes the slide glasses G from the cassette 41 in the removal position M3 and delivers the slide glasses G to the slide glass conveyance unit 23. Further, the slide glass removal unit 22 receives the slide glasses G for which the image acquisition of the image acquisition unit 24 has been completed from the slide glass conveyance unit 23 and causes the slide glasses G to return to original holding positions in the cassette 41.

Driving of the conveyance hand by the slide glass removal unit 22 is controlled on the basis of the holding information that is output from the slide glass detection unit 33. For example, the slide glass removal unit 22 may extract only the slide glass G of which the holding position or the holding state has been detected as being normal using the conveyance hand, and skip the extraction of the slide glass G of which the holding position or the holding state has been detected as being abnormal.

The slide glass conveyance unit 23 conveys the slide glass G received from the slide glass removal unit 22 toward the image acquisition unit 24. Further, the slide glass conveyance unit 23 conveys the slide glass G between a macro image acquisition position and a micro image acquisition position of the image acquisition unit 24. The slide glass conveyance unit 23 delivers the slide glass G for which the image acquisition unit 24 has completed image acquisition, to the slide glass removal unit 22.

The image acquisition unit 24 images a sample held on the slide glass G and acquires an image of the sample. The image acquisition unit 24 includes, for example, a macro image acquisition device and a micro image acquisition device. The macro image acquisition device acquires a macro image of the slide glass G conveyed to the macro image acquisition position by the slide glass conveyance unit 23 using an imaging device for macro image acquisition. The macro image acquisition device sets an acquisition range (a scan range) of the micro image, a focus measurement position, and the like on the basis of the acquired macro image.

The micro image acquisition device acquires a micro image of the slide glass G conveyed to the micro image acquisition position by the slide glass conveyance unit 23, using an imaging device for micro image acquisition. The micro image acquisition device creates a focus map of the sample on the basis of the scan range and the focus measurement position set by the macro image acquisition device, using an objective lens with a high magnification of, for example, 40×, 80×, or 100×. The micro image acquisition device controls a height of the objective lens with respect to the sample on the basis of the created focus map, and acquires a micro image in the scan range using the imaging device for micro image acquisition. The image acquisition unit 24 outputs data of a macro image acquired by the macro image acquisition device, data of a micro image acquired by the micro image acquisition device, data such as a scan range and a focus map to the image processing unit 25.

A scanning scheme in the micro image device may be a strobe scanning scheme using an area image sensor or may be a line scanning scheme using a line scan sensor. Further, the scanning scheme may be a stop-and-go scheme in which movement, stop, and imaging of the slide glass are repeatedly performed in the scan range.

The image processing unit 25 is a unit that processes the image acquired by the image acquisition unit 24. The image processing unit 25 is configured of, for example, a computer system such as a Field-Programmable Gate Array (FPGA), an Applications Specific Integrated Circuit (ASIC), or a microcomputer. The image processing unit 25 combines macro image data and micro image data received from the image acquisition device 11 to generate a virtual slide image of the sample. The image processing unit 25 outputs the generated virtual slide image to the control computer 12 together with data such as the scanning conditions. The control computer 12 associates data such as the virtual slide image and the scanning conditions with the cassette identification information. The data such as the virtual slide images and the scanning conditions associated by the control computer 12 are stored in the data server 14.

Next, the identification code reading unit 32 described above will be described in more detail.

Figure 7:
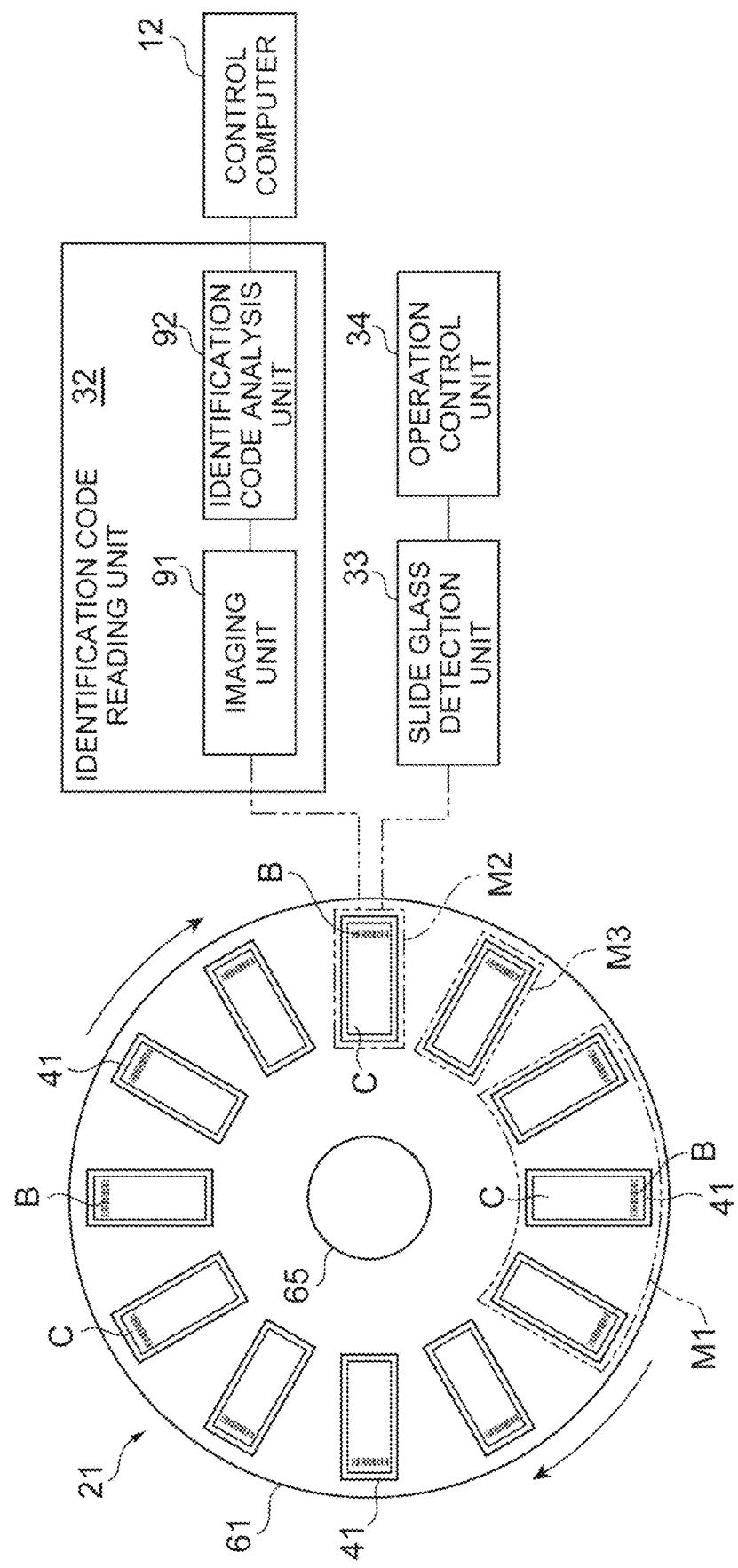
FIG. 7 is a block diagram illustrating an example of an identification code reading unit.

FIG. 7 is a block diagram illustrating an example of the identification code reading unit. As illustrated in FIG. 7, the identification code reading unit 32 includes an imaging unit 91 and an identification code analysis unit 92.

The imaging unit 91 images at least one of the bar code B and the two-dimensional code D imparted to the identification card C. The imaging unit 91 is disposed above the rotation drum 61 in the cassette mounting unit 21 to correspond to, for example, the reading position M2. An imaging axis of the imaging unit 91 passes through the notch portion 68 of the top plate 63 in the rotation drum 61 and is directed to the placement unit 49 of the cassette 41 exposed from the notch portion 68 (that is, the identification card C on the placement unit 49). The imaging unit 91 acquires an image of one surface side of the identification card C to which the bar code B and the two-dimensional code D have been imparted, and outputs image data to the identification code analysis unit 92.

The identification code analysis unit 92 analyzes the image data received from the imaging unit 91. The identification code analysis unit 92 analyzes the cassette identification information included in the bar code B or the two-dimensional code D on the basis of the image data, and outputs the cassette identification information to the control computer 12. The cassette identification information is, for example, a multi-digit character string including alphabets or numbers. The control computer 12 having received the cassette identification information controls an operation of the rotation drum 61 via the operation control unit 34 so that the cassette 41 identified by the cassette identification information is located at the removal position M3.

In the embodiment, as described above, detection of the holding position or the holding state of the slide glass G in the cassette 41 by the slide glass detection unit 33 is also executed in the reading position M2. The slide glass detection unit 33 includes, for example, a photoelectric sensor, and detects the holding position or the holding state of the slide glass G in the cassette 41 on the basis of a detection result of the reflected light when scanning is performed with the inspection light emitted from the photoelectric sensor in the height direction on the front surface side of the cassette 41. The slide glass detection unit 33 outputs holding information indicating the detection result to the operation control unit 34.

Next, an operation of the image acquisition system 1 will be described.

Figure 8:
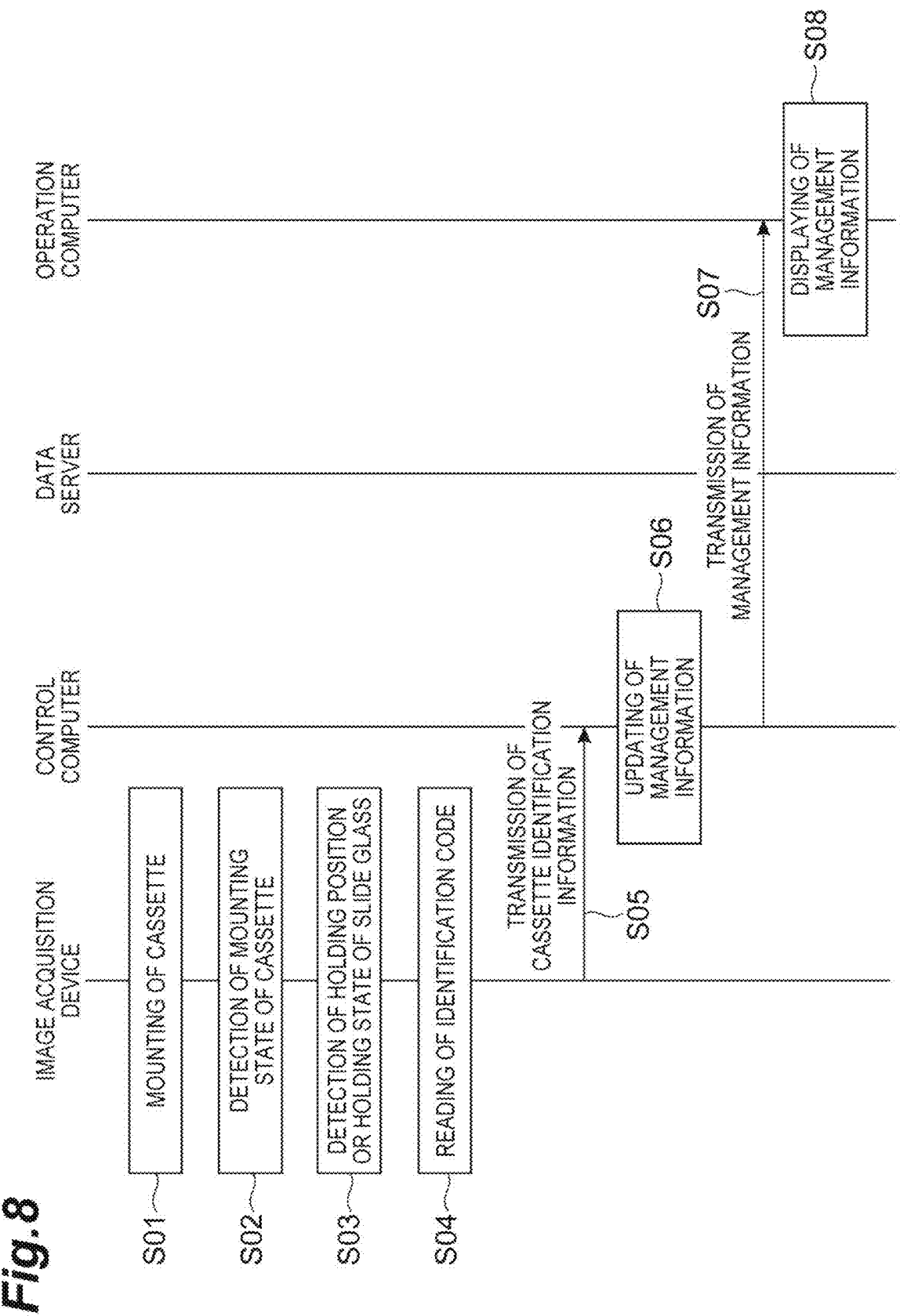
FIG. 8 is a flowchart illustrating an example of an operation of an image acquisition system at the time of mounting a cassette.

FIG. 8 is a flowchart illustrating an example of the operation of the image acquisition system at the time of mounting a cassette. As illustrated in FIG. 8, in the image acquisition system 1, first, the cassette 41 is mounted in the cassette mounting unit 21 of the image acquisition device 11 (step S01: mounting step). In step S01, the identification card C is held in the placement unit 49 of the cassette 41 in advance. Then, in the image acquisition device 11, the cassette mounting detection unit 31 detects a mounting state of the cassette 41 in the cassette mounting unit 21 (step S02: cassette detection step).

In step S02, when it is detected that the mounting state of the cassette 41 is abnormal, the driving of the rotation drum 61 is prohibited, and the mounting state of the cassette 41 being abnormal is reported to the outside. On the other hand, when it is detected in step S02 that the mounting state of the cassette 41 is normal, the cassette 41 is sent from the mounting position M1 to the reading position M2 by driving of the rotation drum 61.

When the cassette 41 is sent to the reading position M2, the slide glass detection unit 33 detects the holding position or the holding state of the slide glass G in the cassette 41 (step S03: slide detection step). When it is detected in step S03 that the holding position or the holding state of the slide glass G is abnormal, subsequent processes may be stopped, and slide glass removal (step S12) and acquisition of image data (step S13) to be described below may be skipped for the slide glass G detected to be abnormal.

Further, in the reading position M2, the identification code reading unit 32 reads a bar code B or a two-dimensional code D in the identification card C held in the placement unit 49 of the cassette 41 (step S04: reading step). The cassette identification information included in the read bar code B or two-dimensional code D is transmitted to the control computer 12 (step S05). It should be noted that either the reading of the bar code B or the two-dimensional code D or the detection of the holding position or the holding state of the slide glass G may be executed first or may be executed simultaneously.

In the control computer 12 that has received the cassette identification information, management information is updated (step 506: management step). The management information is information for managing an execution order of image acquisition for each cassette 41 based on the input of start instruction information (to be described below). In an example of FIG. 9, the management information is configured by associating the cassette identification information, the execution order of image acquisition of the cassette 41 corresponding to the cassette identification information, and an execution situation of the image acquisition of the cassette 41 corresponding to the cassette identification information. When the cassette identification information is newly received, the control computer 12 performs addition of the cassette identification information, addition of the execution order, changing of the execution situation, or the like, and updates the management information. The updated management information is transmitted to the operation computer 13 via the data server 14 (step S07) and displayed on a display device of the operation computer 13 (step S08).

FIG. 10 is a flowchart illustrating an example of the operation subsequent to FIG. 8. As illustrated in FIG. 10, the operation computer 13 on which the management information is displayed receives, for example, an input of scanning conditions or the like from the user (step S09: scanning conditions input step). In step S09, reception of an input of the start instruction information for instructing start of acquisition of image data by the image acquisition unit 24, and an input of the cassette identification information of the cassette 41 holding the slide glass G, which is an acquisition target of the image data, are performed, in addition to the input of the scanning conditions. Further, in step S09, an input of acquisition source identification information for identifying an acquisition source of a sample may be received.

The input scanning conditions or the like is transmitted from the operation computer 13 to the control computer 12 together with the start instruction information (step S10). In the control computer 12, association of the received scanning conditions, acquisition source identification information, management information, and the like with the cassette identification information is executed (step S11: association step). In the control computer 12 that has received the start instruction information, control of the image acquisition device 11 is executed on the basis of the scanning conditions, management information, and the like (step S12). Specifically, first, the cassette 41 specified on the basis of the cassette identification information is sent from the reading position M2 to the removal position M3 by the driving of the rotation drum 61.

In the removal position M3, removal of the slide glass G in the cassette 41 is performed by the slide glass removal unit 22 (step S13). The slide glass G taken out is sent to the image acquisition device 11 by the slide glass conveyance unit 23. In the image acquisition device 11, acquisition of a macro image, and acquisition of a micro image based on the input scanning conditions are executed, and a virtual slide image of a sample is generated (step S14: image acquisition step). The slide glass G that has been scanned returns into the cassette 41 again by the slide glass removal unit 22 and the slide glass conveyance unit 23, and the cassette 41 is sent from the removal position M3 to the mounting position M1 by the drive of the rotation drum 61. The cassette 41 is removed from the cassette mounting unit 21 in the mounting position M1 (step S15).

Then, the cassette identification information of the cassette 41 removed from the cassette mounting unit 21 is transmitted from the image acquisition device 11 to the control computer 12 (step S16). In step S15, end information indicating that the acquisition of image data has ended may be transmitted to the data server 14 together with the cassette identification information. The control computer 12 updates the management information on the basis of the received cassette identification information and the received end information (step S17: management step).

Further, the image data of the virtual slide image generated by the image acquisition device 11 in step S14 is output to the control computer 12 (step S18), and the image data is associated with the cassette identification information. In this case, the image data may be associated with the scanning conditions or the like at the time of image acquisition together with the cassette identification information. The image data, the scanning conditions, the cassette identification information, and the like associated with one another are transmitted from the control computer 12 to the data server 14 (step S19). The data server 14 stores the received image data, scanning conditions, cassette identification information, and the like in association with one another (step S20: storage step). In step S20, the acquisition source identification information input in step S09 may be further associated.

In an example illustrated in FIG. 11, the cassette identification information, the acquisition source identification information of the sample, and scanning conditions 1 to 3 to be used by the micro image acquisition device are stored in the data server 14 in association with the image data. In this example, the acquisition source identification information of the sample is a patient ID for identifying a patient who is a provider of a biological sample. Further, scanning conditions 1 is a magnification of the objective lens, scanning conditions 2 is the scan range, and scanning conditions 3 is the number of focal position measurements.

Then, the image data and the cassette identification information are transmitted from the data server 14 to the operation computer 13 (step S21), and the image data is displayed on the display device of the operation computer 13 (step S22). The operation computer 13 can browse the image data of the sample of each slide glass G on the basis of the image data. When the user executes browsing of the image data with the operation computer 13, browsing information indicating that browsing has been performed is generated for each slide glass G and transmitted from the operation computer 13 to the control computer 12 (step S23: browsing step).

In the control computer 12 that has received the browsing information, browsing history information and the cassette identification information are associated (step S24: associating step). The browsing history information and the cassette identification information associated with each other are transmitted from the control computer 12 to the data server 14 (step S25) and stored in the data server 14 (step S26). In the example illustrated in FIG. 12, the cassette identification information and the browsing information of the image data of each slide glass G are associated with each other to constitute browsing history information. Browsing situation of the image data for each slide glass G is managed for each cassette 41 on the basis of the browsing history information.

Figure 13:
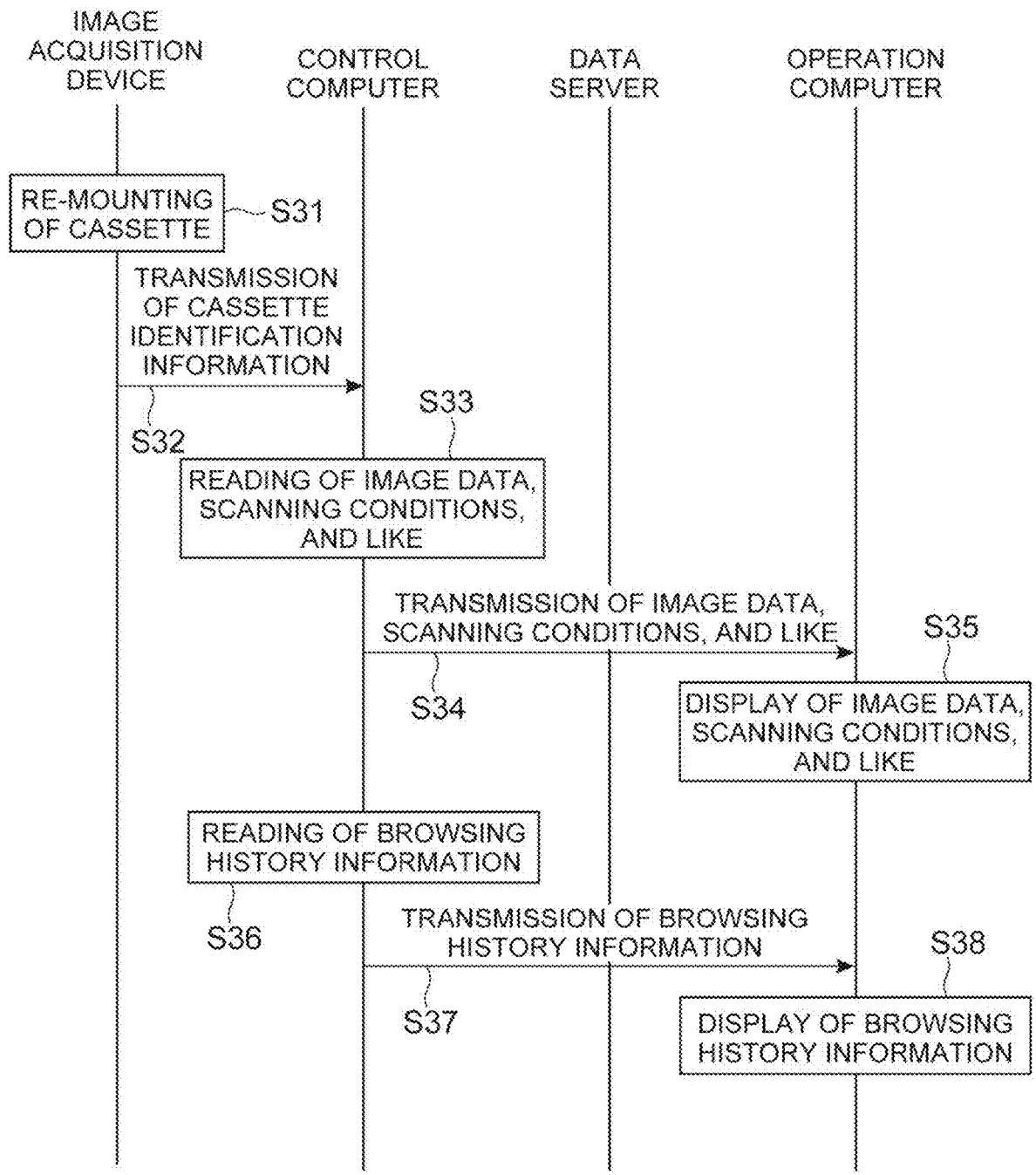
FIG. 13 is a flowchart illustrating an example of an operation of the image acquisition system at the time of re-mounting of the cassette.

FIG. 13 is a flowchart illustrating an example of the operation of the image acquisition system at the time of re-mounting of the cassette. Although the processes of step S01 to step S26 described above are executed also in the case of re-mounting of the cassette, only a process that occurs in the case of re-mounting of the cassette is illustrated in FIG. 13 in order to simplify the description.

As illustrated in FIG. 13, first, the cassette 41 is mounted in the cassette mounting unit 21 of the image acquisition device 11 again (step S31). Then, the bar code B or the two-dimensional code D of the identification card C is read by the identification code reading unit 32, and the cassette identification information of the re-mounted cassette 41 is transmitted from the image acquisition device 11 to the control computer 12. (step S32). The control computer 12 executes reading of the image data, the scanning conditions, and the like on the basis of the received cassette identification information (step S33). The read image data, scanning conditions, and the like are transmitted to the operation computer 13 via the data server 14 (step S34).

In the operation computer 13, the received image data, scanning conditions, and the like are displayed on the display device (step S35). Accordingly, the user can browse the image data and the scanning conditions acquired in previous or subsequent image acquisitions with the display device of the operation computer 13. Further, the control computer 12 executes reading of the browsing history information on the basis of the received cassette identification information (step S36). The read browsing history information is transmitted to the operation computer 13 via the data server 14 (step S37). In the operation computer 13, the received browsing history information is displayed on the display device (step S38). Accordingly, the user can ascertain a browsing situation of the image data for each slide glass G.

As described above, in the image acquisition system 1, the image data acquired by the image acquisition unit 24 is associated with the cassette identification information. Thus, by associating the image data in units of cassettes, the slide glass G linked to the cassette 41 becomes clear. Therefore, it is possible to simplify the storage work or the re-preparation work of the slide glass G, as compared with a case in which the image data of the slide glass G is managed in units of jobs. Further, in the image acquisition system 1, the imaging unit 91 images the bar code B or the two-dimensional code D exposed from the notch portion 68 of the cassette mounting unit 21 in the reading position M2. Accordingly, it is also possible to achieve simplification of a device configuration necessary for reading of the bar code B or the two-dimensional code D.

Further, in the embodiment, the cassette mounting unit 21 includes the rotation drum 61 including the bottom plate 62, the top plate 63, and the cassette holding plate 64 that is radially disposed between the bottom plate 62 and the top plate 63 and forms the holding space S of the cassette 41 in a circumferential direction. The exposure portion that exposes the bar code B or the two-dimensional code D is configured by the notch portion 68 provided in the top plate 63 according to a position in the holding space S. With such a configuration, the bar code B or the two-dimensional code D exposed from the notch portion 68 of the rotation drum 61 can be imaged by the imaging unit 91 without an increase in a size of the rotation drum 61.

Further, in the embodiment, the image acquisition system further includes the slide glass detection unit 33 that detects the holding position or the holding state of the slide glass G in the cassette 41 mounted in the cassette mounting unit 21. The reading position M2 of the identification code reading unit 32 and the detection position of the slide glass detection unit 33 are the same positions. Therefore, control of sending of the cassette 41 mounted in the cassette mounting unit 21 can be simplified.

Further, in the embodiment, the image acquisition system includes the identification card C to which the bar code B or the two-dimensional code D has been imparted, and the placement unit 49 to which the identification card C is detachably attached is provided in the cassette 41. By storing the slide glass G and the identification card C of which the image acquisition has ended together through introduction of the identification card C, it is possible to further simplify storage work or re-preparation work for the slide glass G. Further, by replacing the identification card C, the same bar code B can be simply imparted to a different cassette 41. Accordingly, convenience when image acquisition of the slide glass G held in another cassette 41 is executed with the same scanning conditions or the like can be improved. By replacing the slide glass G in the cassette 41 instead of replacing the identification card C, it is also possible to repeatedly execute image acquisition of another slide glass G with the same scanning condition or the like.

Further, since at least one of the bar code B and the two-dimensional code is used as the identification code, it is possible to perform management of the cassette identification information further easily. The identification code imparted to the identification card C may be only the bar code B, may be only the two-dimensional code D, or may be both the bar code B and the two-dimensional code D. The identification code imparted to the identification card C is not limited to the bar code or the two-dimensional code, and any code may be used.

Further, in the embodiment, the control computer 12 associates the scanning conditions when the image acquisition unit 24 acquires the image data of the sample with the cassette identification information. Accordingly, when rescanning of the slide glass G is performed, it is possible to simply call past scanning conditions. Therefore, it is possible to perform resetting of the scanning conditions while referring to the past scanning conditions.

Further, in the embodiment, the data server 14 constitutes a storage unit that stores the image data acquired by the image acquisition unit 24, and the operation computer 13 constitutes a browsing unit that reads and displays the image data stored in the data server 14. The control computer 12 associates the browsing history information indicating the browsing history via the operation computer 13 with the cassette identification information. Accordingly, it is possible to suitably prevent omission of browsing of the image data stored in the data server 14. Further, the user can browse the image data efficiently.

Further, in the embodiment, the control computer 12 associates the acquisition source identification information for identifying an acquisition source of a sample with the cassette identification information. Accordingly, it is possible to suitably prevent sample misunderstanding from occurring. Further, in the embodiment, the control computer 12 associates the management information indicating the execution order of image acquisition for each cassette 41 with the cassette identification information. Accordingly, scan execution management of the slide glasses G using the common image acquisition unit 24 can be performed among the plurality of operation computers 13.

REFERENCE SIGNS LIST

1: Image acquisition system
13: Operation computer (browsing unit)
14: Data server (storage unit)
21: Cassette mounting unit
24: Image acquisition unit
32: Identification code reading unit (reading unit)
33: Slide glass detection unit
41: Cassette
49: Placement unit (attachment unit)
61: Rotation drum
62: Bottom plate
63: Top plate
64: Cassette holding plate
68: Notch portion (exposure portion)
91: Imaging unit
B: Bar code (identification code)
C: identification card
D: two-dimensional code (identification code)
G: Slide glass
M2: Reading position
S: Holding space

The invention claimed is:

1. A system comprising:
   a cassette mounting unit configured to be detachably mounted with a cassette holding a slide glass in a plurality of stages in a predetermined arrangement direction and having an identification code imparted thereto;
   a reader configured to read the identification code from the cassette sent to a reading position by the cassette mounting unit;
   an image acquisition unit configured to acquire image data of a sample held on the slide glass in the cassette; and
   a controller configured to associate the image data acquired by the image acquisition unit with cassette identification information included in the identification code read by the reader,
   wherein the cassette mounting unit includes an exposure portion configured to expose the identification code imparted to the cassette,
   the reader includes an imaging unit configured to image the identification code exposed from the exposure portion in the reading position,
   the cassette mounting unit includes a rotation drum including a bottom plate, a top plate, and a cassette holding plate that is radially disposed between the bottom plate and the top plate and forms a holding space of the cassette in a circumferential direction, and
   the exposure portion is configured by a notch portion provided in the top plate according to a position in the holding space.

2. The system according to claim 1 further comprising:
   a slide glass detector configured to detect at least one of a holding position and a holding state of the slide glass in the cassette mounted in the cassette mounting unit,
   wherein the reading position of the reader and a detection position of the slide glass detector are the same positions.

3. The system according to claim 1, comprising an identification card to which the identification code has been imparted,
   wherein an attachment configured to have the identification card detachably attached thereto is provided in the cassette.

4. The system according to claim 3, wherein the identification code is at least one of a bar code and a two-dimensional code.

5. The system according to claim 1, wherein the controller associates scanning conditions when the image acquisition unit acquires the image data of the sample with the cassette identification information.

6. The system according to claim 1, further comprising:
   a storage configured to store the image data acquired by the image acquisition unit; and
   a browser configured to read and to display the image data stored in the storage,
   wherein the controller associates browsing history information indicating a browsing history via the browser with the cassette identification information.

7. The system according to claim 1, wherein the controller associates acquisition source identification information for identifying an acquisition source of the sample with the cassette identification information.

8. The system according to claim 1, wherein the controller associates management information indicating an execution order of image acquisition for each cassette with the cassette identification information.

9. A method comprising:
   mounting a cassette in a cassette mounting unit, the cassette holding the slide glasses a slide glass in a plurality of stages in a predetermined arrangement direction and having an identification code imparted thereto;
   reading the identification code from the cassette sent to a reading position by the cassette mounting unit;
   acquiring image data of a sample held on the slide glass in the cassette; and
   associating the image data with cassette identification information included in the identification code,
   wherein the cassette mounting unit includes a rotation drum including a bottom plate, a top plate, and a cassette holding plate that is radially disposed between the bottom plate and the top plate and forms a holding space of the cassette in a circumferential direction, and an exposure portion configured by a notch portion provided in the top plate according to a position in the holding space, the exposure portion configured to expose the identification code imparted to the cassette, and
   the reading includes imaging the identification code exposed from the exposure portion in the reading position.

10. The method according to claim 9, wherein the associating includes associating scanning conditions when the image data of the sample has been acquired with the cassette identification information.

11. The method according to claim 9, further comprising:
    storing the image data; and
    browsing the image data,
    wherein the associating includes associating browsing history information indicating a browsing history with the cassette identification information.

12. The method according to claim 9, wherein the associating includes associating acquisition source identification information for identifying an acquisition source of the sample with the cassette identification information.

13. The method according to claim 9, wherein the associating includes associating management information indicating an execution order of image acquisition for each cassette with the cassette identification information.

14. The method according to claim 9, wherein at least one of a bar code and a two-dimensional code is used as the identification code.

* * * * *